United States Patent
Jinzaki

(10) Patent No.: US 7,590,757 B2
(45) Date of Patent: Sep. 15, 2009

(54) BROADCAST TYPE COMMUNICATION DATA DISTRIBUTION DEVICE AND BROADCAST TYPE COMMUNICATION SYSTEM

(75) Inventor: Akira Jinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 775 days.

(21) Appl. No.: 10/608,064

(22) Filed: Jun. 30, 2003

(65) Prior Publication Data

US 2004/0019642 A1 Jan. 29, 2004

(30) Foreign Application Priority Data

Jul. 11, 2002 (JP) ............................. 2002-202165

(51) Int. Cl.
*G06F 15/16* (2006.01)
*G06F 15/173* (2006.01)

(52) U.S. Cl. ................... 709/245; 709/201; 709/202; 709/203; 709/230; 709/238

(58) Field of Classification Search ......... 709/201–203, 709/230–239, 245
See application file for complete search history.

(56) References Cited

U.S. PATENT DOCUMENTS

| | | | | |
|---|---|---|---|---|
| 5,550,897 | A * | 8/1996 | Seiderman | 455/558 |
| 5,774,465 | A * | 6/1998 | Lau et al. | 370/395.3 |
| 5,948,089 | A * | 9/1999 | Wingard et al. | 710/107 |
| 6,337,850 | B1 * | 1/2002 | Nakano et al. | 370/230 |
| 6,356,553 | B1 * | 3/2002 | Nagami et al. | 370/397 |
| 6,415,323 | B1 | 7/2002 | McCanne et al. | |
| 6,418,138 | B1 * | 7/2002 | Cerf et al. | 370/352 |
| 6,457,059 | B1 * | 9/2002 | Kobayashi | 709/242 |
| 6,625,773 | B1 * | 9/2003 | Boivie et al. | 714/749 |
| 6,704,576 | B1 * | 3/2004 | Brachman et al. | 455/503 |
| 6,937,608 | B1 * | 8/2005 | Deng | 370/432 |
| 7,047,306 | B2 * | 5/2006 | Zee et al. | 709/231 |
| 7,080,135 | B1 * | 7/2006 | Williams | 709/223 |
| 7,082,142 | B1 * | 7/2006 | Begeja | 370/507 |
| 7,123,599 | B2 * | 10/2006 | Yano et al. | 370/331 |

(Continued)

FOREIGN PATENT DOCUMENTS

JP 2001-230774 8/2001

(Continued)

OTHER PUBLICATIONS

B. Zhang et al., "Host Multicast: A Framework for Delivering Multicast to End Users", Proceedings of IEEE Infocom 2002; pp. 1366-1375.

(Continued)

*Primary Examiner*—Kenny S Lin
*Assistant Examiner*—Hieu T Hoang
(74) *Attorney, Agent, or Firm*—Staas & Halsey LLP

(57) ABSTRACT

By using a distribution device 1 comprising a unit 2 analyzing whether received data is broadcast type communication data and a unit 3 relaying the data received from a sender to an addressed receiver and also copying/transferring the data to one or more receivers other than the addressed receiver or another distribution device through a network when received data is broadcast type communication data, in broadcast type communications, the load of the network can be reduced by conducting uni-cast communication between the sender and the distribution device in the network.

13 Claims, 13 Drawing Sheets

U.S. PATENT DOCUMENTS

| | | | |
|---|---|---|---|
| 7,133,922 B1 * | 11/2006 | She et al. | 709/231 |
| 7,334,125 B1 * | 2/2008 | Pellacuru | 713/163 |
| 7,339,903 B2 * | 3/2008 | O'Neill | 370/313 |
| 2002/0057663 A1 | 5/2002 | Lim | |
| 2002/0080755 A1 * | 6/2002 | Tasman et al. | 370/338 |
| 2002/0136163 A1 * | 9/2002 | Kawakami et al. | 370/229 |
| 2002/0138721 A1 * | 9/2002 | Kwon et al. | 713/151 |
| 2002/0141394 A1 * | 10/2002 | Hardisty | 370/352 |
| 2002/0163902 A1 * | 11/2002 | Takao et al. | 370/338 |
| 2002/0181400 A1 * | 12/2002 | Zheng et al. | 370/235 |
| 2002/0194367 A1 * | 12/2002 | Nakamura et al. | 709/238 |
| 2003/0091021 A1 * | 5/2003 | Trossen et al. | 370/349 |
| 2003/0133458 A1 * | 7/2003 | Sato et al. | 370/395.6 |
| 2003/0212814 A1 * | 11/2003 | Tzeng et al. | 709/235 |
| 2003/0225845 A1 * | 12/2003 | Hong | 709/206 |
| 2006/0031557 A1 * | 2/2006 | Walsh et al. | 709/232 |
| 2007/0058629 A1 * | 3/2007 | Luft | 370/390 |

FOREIGN PATENT DOCUMENTS

| | | |
|---|---|---|
| JP | 2002-118552 | 4/2002 |
| JP | 2002-135310 | 5/2002 |
| JP | 2002-185528 | 6/2002 |
| JP | 2003-218935 | 7/2003 |

OTHER PUBLICATIONS

P. Parnes et al; "Lightweight Application Level Multicast Tunneling Using mTunnel", Computer Communications, vol. 21, No. 15, (1998), pp. 1295-1301.

R. Finlayson; "The UDP Multicast Tunneling Protocol, draft-finlayson-umtp-06.txt", Internet-Draft, Network Working Group, Internet Engineering Task Force, Mar. 2001, 9pp.

D. Thaler et al., "IPv4 Automatic Multicast Without Explicit Tunnels (AMT), draft-ietf-mboned-auto-multicast-01.txt", MBoneD Working Group, Internet-Draft, Internet Engineering Task Force, Apr. 2002, pp. 1-20

R. Wittman et al; Sections 2.2 and 2.7 of Multicast Communication: Protocols and Applications, Dec. 2001; pp. 16-18 and 45-52.

European Search Report for Application No. EP 03 25 4357; dated Mar. 22, 2006.

Office Action for Chinese Application No. 031464319 dated May 13, 2005.

Masayuki Yamai, "Special Feature in Series: Chapter 2. IP Multicast, Recent development in applications of TCP/IP technologies", Open Design, vol. 4, No. 5, Oct. 1, 1997, pp. 38-67.

Masao Fujikawa, "Reducing load on IP network; Last step left to clear for winning a multicasting environment", Nikkei Communication, No. 231, Oct. 7, 1996, pp. 85-94.

Notice of Rejection Grounds, mailed Dec. 26, 2006, and issued in corresponding Japanese Patent Application No. 2002-202165.

Japanese Patent Office Notice of Rejection, mailed Jul. 17, 2007 and issued in corresponding Japanese Patent Application No. 2002-202165.

Korean Office Action mailed on Mar. 19, 2009 in corresponding Korean Application No. 10-2003-46716. (5 pages) (5 pages English translation).

* cited by examiner

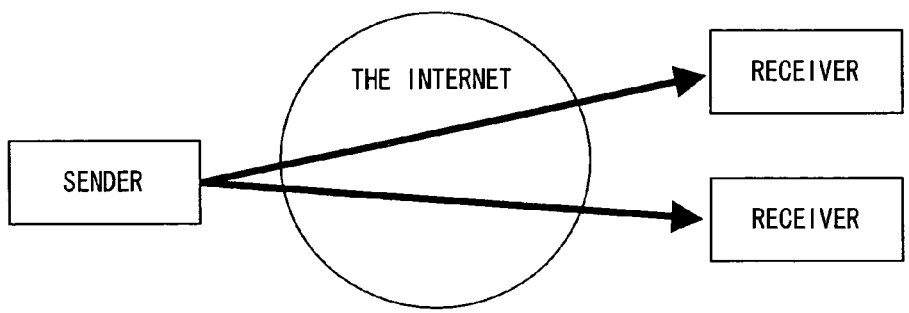

FIG. 1A

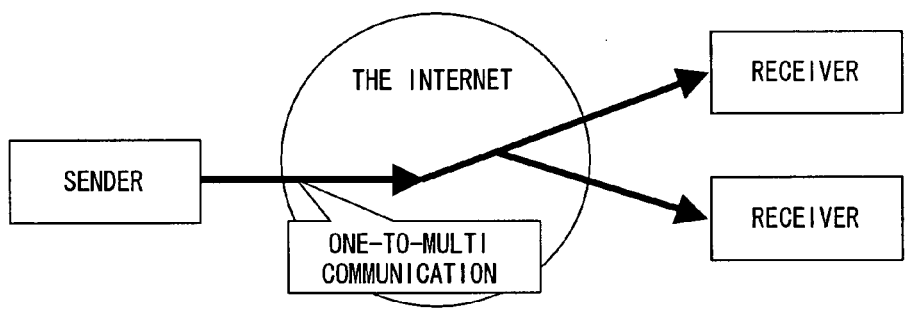

FIG. 1B

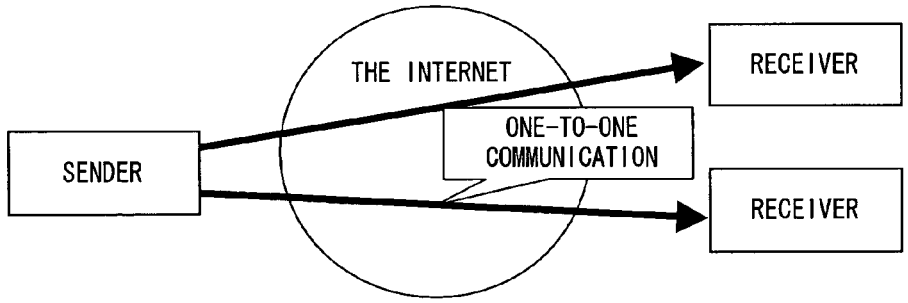

FIG. 1C

|  | MULTI-CAST | UNI-CAST |
|---|---|---|
| LOAD OF SENDER | 1 (LIGHT) | PROPORTIONAL TO THE NUMBER OF RECEIVERS (HEAVY) |
| LOAD OF NETWORK | 1 (LIGHT) | PROPORTIONAL TO THE NUMBER OF RECEIVERS (HEAVY) |
| ADDRESS MANAGEMENT | MULTI-CAST ADDRESS MANAGEMENT (COMPLEX) | NORMAL ADDRESS MANAGEMENT (SIMPLE) |
| NETWORK CONTROL | MULTI-CAST ROUTING (COMPLEX) | NORMAL ROUTING (SIMPLE) |
| RECEIVER CONTROL | MULTI-CAST GROUP MANAGEMENT (COMPLEX) | NORMAL NETWORK CONTROL (SIMPLE) |

FIG. 1D

| DESTINATION ADDRESS | SOURCE ADDRESS (X) | DATA |
|---|---|---|

FIG. 3

|   | byte0 | | byte1 | byte2 | byte3 |
|---|---|---|---|---|---|
| 0 | VERS | HLEN | TOS | TOTAL LENGTH | |
| 4 | IDENTIFICATION | | | FLAGS | FRAGMENT |
| 8 | TIME TO LIVE | | PROTOCOL | HEADER CHECKSUM | |
| 12 | SOURCE IP ADDRESS | | | | |
| 16 | DESTINATION IP ADDRESS | | | | |
| 20 | IP OPTIONS & PADDING | | | | |

|   | byte0 | byte1 | byte2 | byte3 |
|---|---|---|---|---|
| 0 | UDP SOURCE PORT PORT | | UDP DESTINATION PORT | |
| 4 | PORT | | UDP CHECKSUM | |

|   | byte0 | | | | byte1 | byte2 | byte3 |
|---|---|---|---|---|---|---|---|
| 0 | V=2 | X | P | CC | M | PT | Sequence number |
| 4 | timestamp | | | | | | |
| 8 | synchronization source (SSRC) identifier | | | | | | |
| 12 to n | contributing source (CSRC) identifiers | | | | | | |

F I G. 6

| DISTRIBUTION FLAG | DESTINATION ADDRESS | STREAM IDENTIFIER | OTHERS |
|---|---|---|---|
| 1 | A | Xid1 | . |
| 1 | B | Xid1 | . |
| . | . | . | . |
| . | . | . | . |

F I G. 9

| NAME OF STREAM | STREAM IDENTIFIER | NETWORK ADDRESS | DISTRIBUTION DESTINATION |
|---|---|---|---|
| IMAGE 1 | Xid1 | X1 | A, B, ··· |
| . | . | . | . |
| . | . | . | . |

FIG. 11

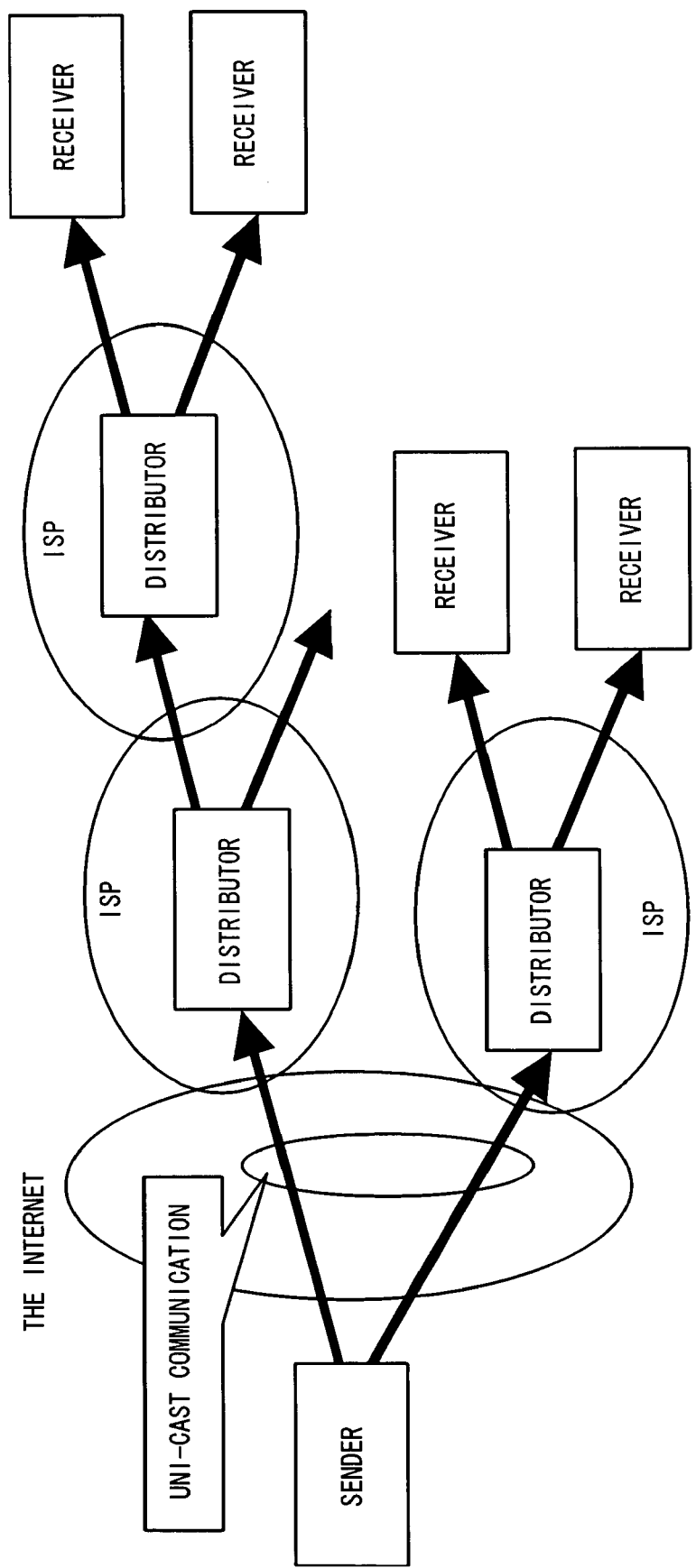
F I G. 13

BROADCAST TYPE COMMUNICATION DATA DISTRIBUTION DEVICE AND BROADCAST TYPE COMMUNICATION SYSTEM

BACKGROUND OF THE INVENTION

1. Field of the Invention

The present invention relates to the control method of broadcast type communication, and more specifically, it relates to the configuration of a distribution device and its communication control method, for example, adopted when conducting broadcast type communication in the form of packet communication.

2. Description of the Related Art

Broadcast type communication that transmits one segment of data from a sender to a plurality of receivers is widely used. A conventional TV broadcast is one example of such broadcast type communication using electrical waves. Recently, as shown in FIG. 1A, basic demand for 1-to-1 broadcast type communication has increased. The distribution of images and voice by streaming that is conducted over the Internet is such one example. Although the present invention is described below using the Internet as an example, the application of the present invention is not limited to the Internet.

In a packet communication network, such as the Internet, multi-cast or uni-cast communication methods are used to conduct broadcast type communication. FIG. 1B shows a multi-cast broadcast type communication. In multi-cast communications, a sender distributes data to a plurality of receivers by transmitting a packet to prescribed multi-cast addresses and data is distributed to the plurality of receivers by copying/transferring the packet in a network according to prescribed routing information. In this multi-cast broadcast type communication, the load of a network is reduced.

FIG. 1C shows uni-cast broadcast type communication. In the uni-cast communication, 1-to-1 packet communication is conducted between a sender and each of a plurality of receivers, and the same data is transmitted from the sender to the plurality of receivers. In this method, since many communications are simultaneously conducted, the traffic increases, which is a problem.

FIG. 1D shows the merits and demerits of both a multi-cast method and a uni-cast method. Regarding the load of a sender, in the multi-cast method, a packet is transmitted only once in the uni-cast method, since a packet is transmitted to each of the plurality of receivers, the load of the sender increases in proportion to the number of receivers. And the load of a network also increases. However, regarding three items of address management, network control and receiver control, in the multi-cast method, they become complex, while in the uni-cast method, they are simple as in the case of 1-to-1 packet communication.

In this way, in reality, either a uni-cast method or a multi-cast method is used depending on the merits and demerits. This is the problem of selection. In multi-cast method, addresses and routing must be managed, while in a uni-cast method, there is no need for special management and is widely used. The broadcast of images and voice called "webcast" over the Internet adopts this uni-cast method.

As described above, if in a conventional method, the uni-cast broadcast type communication is adopted, the load of a sender and a network are both heavy. Therefore, a multi-cast method is used in order to reduce the network load. However, in that case, the address management, network control and receiver control become complex, which is another problem.

SUMMARY OF THE INVENTION

It is an object of the present invention to reduce network load in uni-cast broadcast communication using the Internet. In order to attain the object, a broadcast type communication data distribution device distributing data in a network according to the present invention comprises a broadcast type communication data recognition unit analyzing whether data received from a sender through a network in the form of uni-cast communication is broadcast type communication data; and a copy/transfer unit relaying data to an addressed receiver, copying the data and transferring the data to one or more receivers other than the addressed receiver or another distribution device through the network, if the data is broadcast type communication data.

A broadcast type communication system conducting broadcast type communications according to the present invention comprises a transmitter device transmitting broadcast type communication data to a receiver through a network in the form of uni-cast communication; and a distribution device provided between the sender and a plurality of receivers that relays data received from the sender through the network and also copies/transfers the data to one or more receivers other than the addressed receiver, if the data is broadcast type communication data.

BRIEF DESCRIPTION OF THE DRAWINGS

FIG. 1A shows a conventional broadcast type communication system;

FIG. 1B shows a conventional multi-cast broadcast type communication system;

FIG. 1C shows a conventional uni-cast broadcast type communication system;

FIG. 1D shows the merits/demerits of both a multi-cast method and a uni-cast method;

FIG. 3 shows the basic structure of a broadcast type communication data packet;

FIG. 6 shows the structure of a packet header for RPT/IPv4;

FIG. 9 shows an example of the stored contents of a receiver information table;

FIG. 11 shows the stored contents of a stream distribution table;

FIG. 13 shows the third example configuration of a broadcast type communication system in the preferred embodiment.

DESCRIPTION OF THE PREFERRED EMBODIMENTS

Figure 2A:
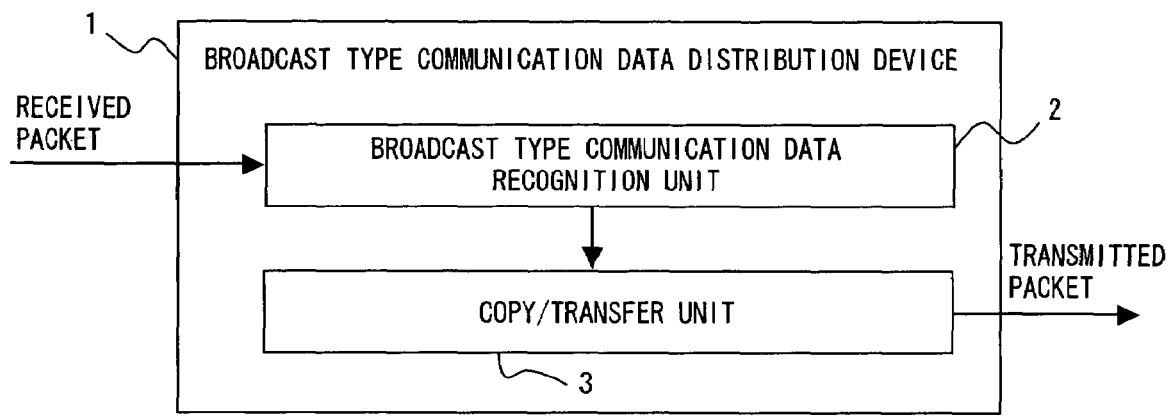
FIG. 2A shows the basic configuration of a broadcast type communication data distribution device according to the present invention.

FIG. 2A shows the basic configuration of a broadcast type communication data distribution device according to the present invention. FIG. 2A shows the configuration of a broadcast type communication data distribution device 1 distributing data, in particular broadcast type communication data, in a network. The device 1 comprises a broadcast type communication data recognition unit 2 and a copy/transfer unit 3.

The broadcast type communication data recognition unit 2 analyzes whether data received from a sender through the network in the form of uni-cast communication, for example, a received packet, is broadcast type communication data. The copy/transfer unit 3 relays the data to an addressed receiver and also copies the data, and transfers the data to one or more receivers other than the addressed receiver or another distribution device through the network.

In another preferred embodiment, the broadcast type communication data recognition unit 2 can also analyze a source address in the data and recognize that the data is broadcast type communication data. If a sender transmits a plurality of segments of broadcast type communication data, each piece of data can be identified by the identifier of the broadcast type communication data that is further extracted by analyzing the source address.

In another preferred embodiment, the broadcast type communication data distribution device 1 can also further comprise a broadcast type communication control table storage unit storing the addresses of receivers for which the data is copied and transferred and a data transfer available/unavailable flag for the receiver, in relation to the identifier of the broadcast type communication data.

In another preferred embodiment, the broadcast type communication data recognition unit 2 can also further extract control information about both relay and copy/transfer of received data by analyzing the source address, and the control information can indicate one of the addition of a receiver, the deletion of a receiver, the deletion of all the receivers of the broadcast type communication data corresponding to an identifier, the stoppage of data distribution to a receiver and re-start.

In another preferred embodiment, the copy/transfer unit 3 can also convert control information extracted by the broadcast type communication data recognition unit 2 into scrambled information received from the sender, and then relay the scrambled data or copy/transfer it. Only when the target of the data relay or copy/transfer is the receiver of the data, control information can be unscrambled. Conversely, all data received from the sender, including the extracted control information can also be relayed or copied/transferred without modifications.

In another preferred embodiment, a receiver receives no substantial data to be finally provided from the sender.

Furthermore, in another preferred embodiment, the broadcast type communication data recognition unit 2 can also analyze a MAC (media access control) address, which is a source address, an Internet protocol address, and the port number of a TCP (transmission control protocol) or a UDP (user datagram protocol).

A broadcast type communication system according to the present invention comprises a transmitter device transmitting broadcast type communication data in the form of uni-cast communication through a network, and a distribution device provided between a sender and a plurality of receivers that relays data and copies/transfers the data to one or more receivers other than an addressed receiver, if data received from the sender through the network is broadcast type communication data.

In the preferred embodiment, the transmitter device comprises a broadcast type communication data identifier storage unit for each of a plurality of broadcast type communication data identifiers. When transmitting one of the plurality of segments of broadcast communication data, the transmitter device can use a network address corresponding to the data as its source address. Furthermore, the source address can also correspond to control information about the relay and copy/transfer of the broadcast type communication data in the distribution device.

As described above, according to the present invention, uni-cast communication is conducted between the transmitter device and the distribution device, and the distribution device copies a plurality of segments of data and transfers them to the receivers.

Figure 2B:
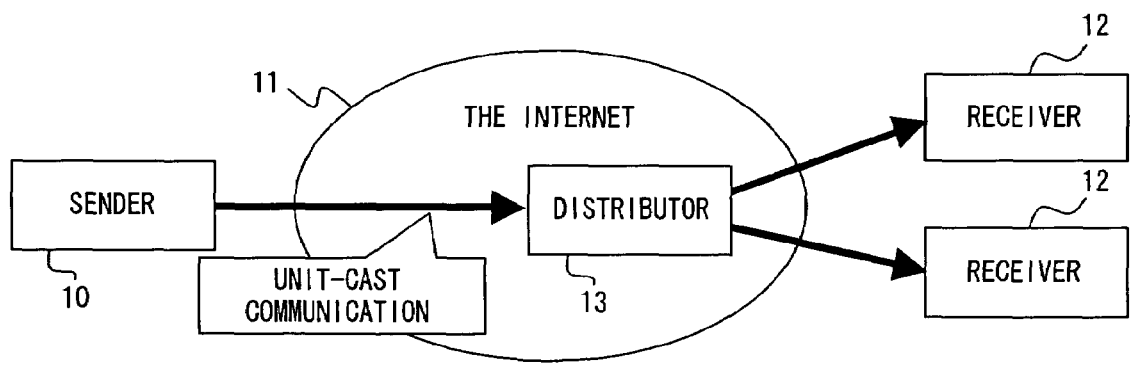
FIG. 2B shows the first example configuration of a broadcast type communication system in the preferred embodiment.

FIG. 2B shows the first example configuration of a broadcast type communication system in the preferred embodiment. In FIG. 2B, it is assumed that a sender 10 transmits broadcast type communication data, for example, a stream of data, to a plurality of receivers 12 through the Internet 11.

In this preferred embodiment of the present invention, a distributor 13 is located between a sender 10 and a plurality of receivers 12, generally close to the receivers 12. In this case, broadcast type communication data is transmitted from the sender 10 to the distributor 13 by uni-cast communication through the Internet 11. Then, the distributor 13 copies the broadcast type communication data according to the number of the receivers and transfers it to each receiver 12. In this way, uni-cast communication is not necessarily needed in a network.

In order to realize such a basic system, the sender 10 must provide a distributor 13 with a variety of information about broadcast type communication. Firstly, if the sender 10 attempts to distribute a plurality of broadcast type communication data, such as a plurality of types of images and voice by means of streaming and the like, to a receiver 12 through the Internet 11, the sender 10 must provide the distributor 13 with information for judging to which stream data received by the distributor 13 it corresponds, the receive address of the distribution data, control information, for example, for the distributor 13 to recognize data, if a new receiver requests the sender 10 to distribute a specific stream of data to him/her and the like.

The sender 10 can also provide the distributor 13 with such information by defining a special protocol, that is, a communication procedure, and exchanging information using it. A RTP control protocol (RTCP) for real time transport protocol (RTP), which is used in the Internet, is one example of such a control-exclusive protocol.

If such a control-exclusive protocol is used, communication must be conducted between the sender 10 and the distributor 13 in order to control the protocol. However, if such information could be exchanged using a packet that stores distribution data instead of such a control-exclusive protocol, the distributor 13 can control communication by checking only distribution data, and accordingly a simple and high-speed process can be realized. In this way, in this preferred embodiment, broadcast type communication is realized without using such a special control-exclusive protocol.

Specifically, in this preferred embodiment, the conveyance of necessary information and instructions from the sender to the distributor is conducted using information that is essentially included in a transfer packet, including distribution data. More specifically, the address field of a packet is used.

In other words, in this preferred embodiment, not only the destination address of a packet is used to notify the distributor of the receiver address of distribution data, but also a part of the field that stores a source address is used to notify the distributor of stream identification information and a variety of pieces of control information.

Generally, how to use an address in a network is regulated and the regulations must be observed. If an address is used without observing the regulations, there will be a problem that no communication can be conducted. If stream identification information and a variety of pieces of control information is set in the field of a source network address and distribution data is transferred, such information can be notified to a distributor by using the transfer packet of the distribution data. The source network address should be managed by a sender and can be pretty freely used according to the regulations.

FIG. 3 shows the basic structure of a broadcast type communication data packet, such as a distribution data packet used in streaming. In FIG. 3, the packet stores a destination address, a source address X and distribution data.

Firstly, the network address of the receiver of stream data is used as a destination address. It is assumed that this receiver includes the distributor 13 shown in FIG. 2B. By storing the network address of a receiver as a destination address, distribution data packet can be automatically distributed to the receiver by the function of a network. If there is a distributor provided on a network route between a sender and a receiver, the distributor monitors the distribution data and exercises copy/transfer control, which is described later, as requested.

Figure 4:
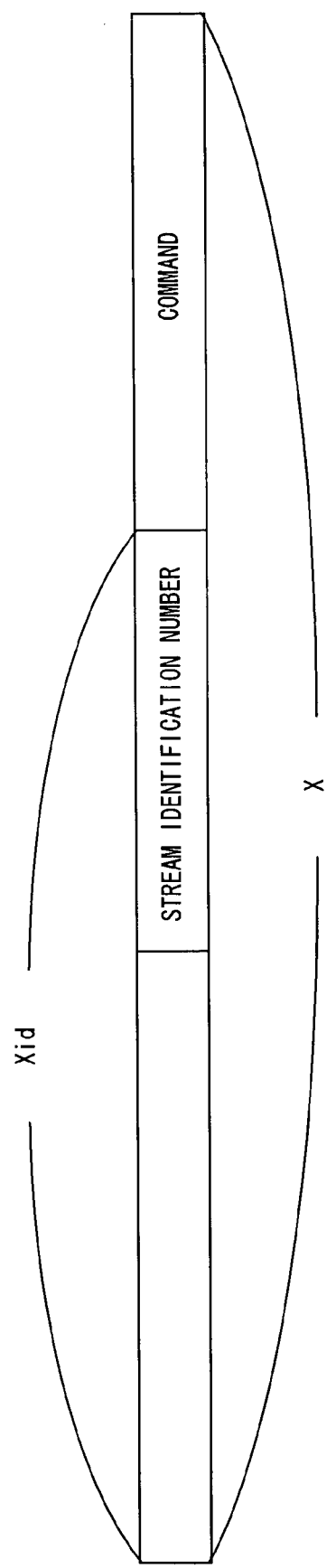
FIG. 4 shows the contents of a source network address storage area.

Distribution data, such as information for identifying a stream, and a variety of pieces of control information is stored in the storage area of the source network address. FIG. 4 shows example contents of a source network address storage area in the preferred embodiment. In FIG. 4, a stream identifier (including a stream identification number) Xid and a command corresponding to control information are stored in the storage area of a source network address X.

If it is assumed that a specific sender can use, for example, 100 network addresses, X1 through X100, including a host address, which is a network address, a part of the network address can be used as a stream identifier by relating each network address to each of a plurality of streams.

Alternatively, only the stream identification number shown in FIG. 4 can be used as a stream identifier. In other words, a part or all of the remaining area obtained after removing a part corresponding to a command from the network address can be used as a stream identifier.

Control information used by a sender to instruct a distributor on how to process distribution data, that is, a command, is also stored as a part of the network address, and a pair of the command and the stream identifier Xid is handled as a network address. The number of bits corresponding to the type of control information is allocated to a command, and the number of bits is notified in advance to a distributor. In this way, by extracting the number of bits from the storage area of the source network address of a received packet, the distributor can receive the command, which is control information.

How to use distribution data identification information, such as a network address, including a stream identifier is restricted according to the regulations of an existing network. For example, the distribution data identification information must be unique in the network so that a sender can be specified. Since generally one sender often distributes a plurality of segments of data, in other words, distributes a plurality of segments of data corresponding to a plurality of streams, a plurality of network addresses are used in accordance with a plurality of streams.

For example, in the Internet protocol, if the transmission of a distribution data packet is stopped in the middle of a route, an ICMP (Internet control message protocol) packet is transmitted to the sender to inform the error. In order to cope with such a situation, a sender can communicate using a network address to which distribution data identification information is allocated.

Figure 5:
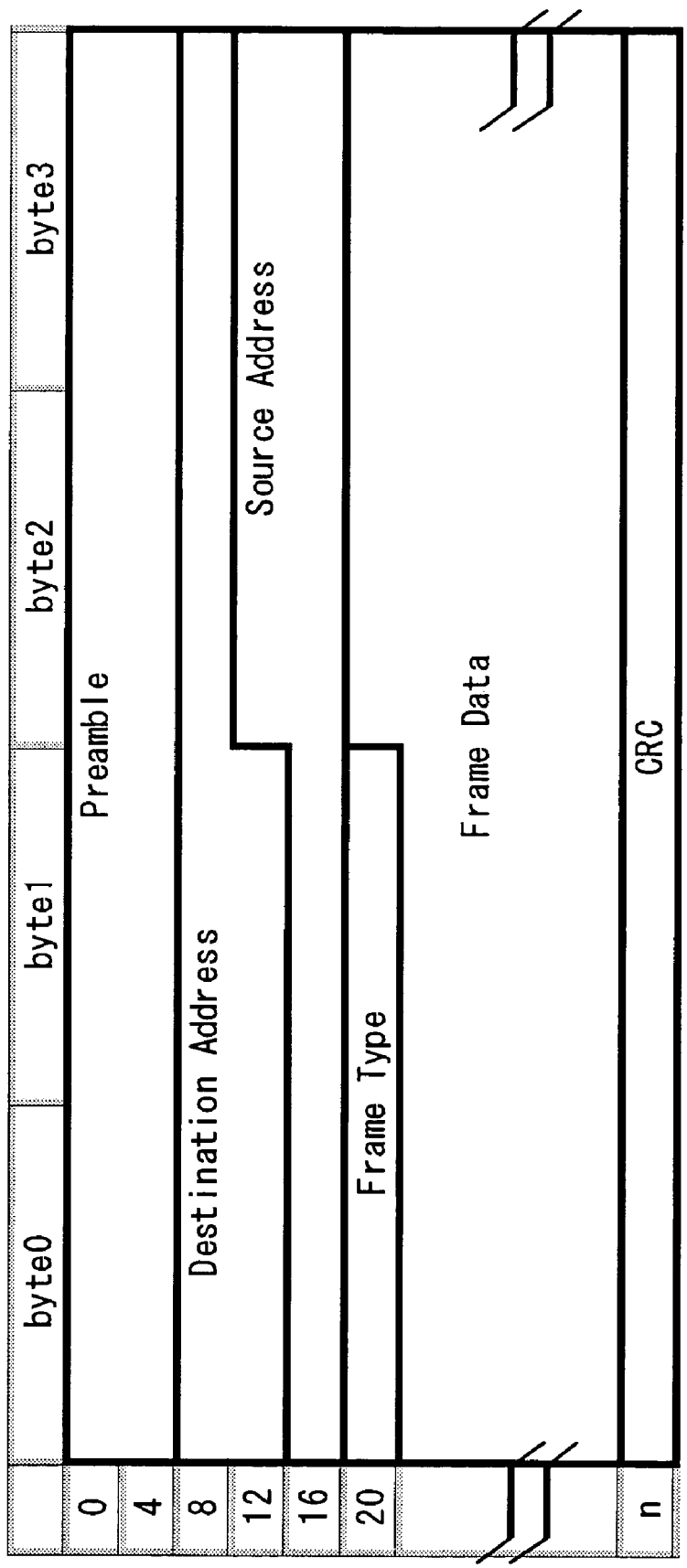
FIG. 5 shows the structure of an Ethernet frame.

FIGS. 5 and 6 show the structure of an Ethernet frame and the structure of the packet header of TRP/IP (Internet protocol) version 4 (v4), respectively. In this preferred embodiment, the sender of distribution data allocates a unique network address to specific distribution data and uses a part of it for distribution data identification information. In this case, artwork address is information to be used to determine a sender and a destination when communicating in a network. In FIG. 5, 48 bits of source address is used as a sender MAC address for this purpose. If a MAC address is used, distribution data is identified in a layer 2 network.

In the RTP/IPv4 packet shown in FIG. 6 and in IP version 6, 32 bits of source IP address in an IP header and 128 bits of address, respectively, are used for this purpose. A sender port number, which is used in TCP and UDP, can also be used for this purpose. If an IP address and a TCP/UDP port number are used, distribution data is identified in a layer 3 and a layer 4, respectively.

Figure 7:
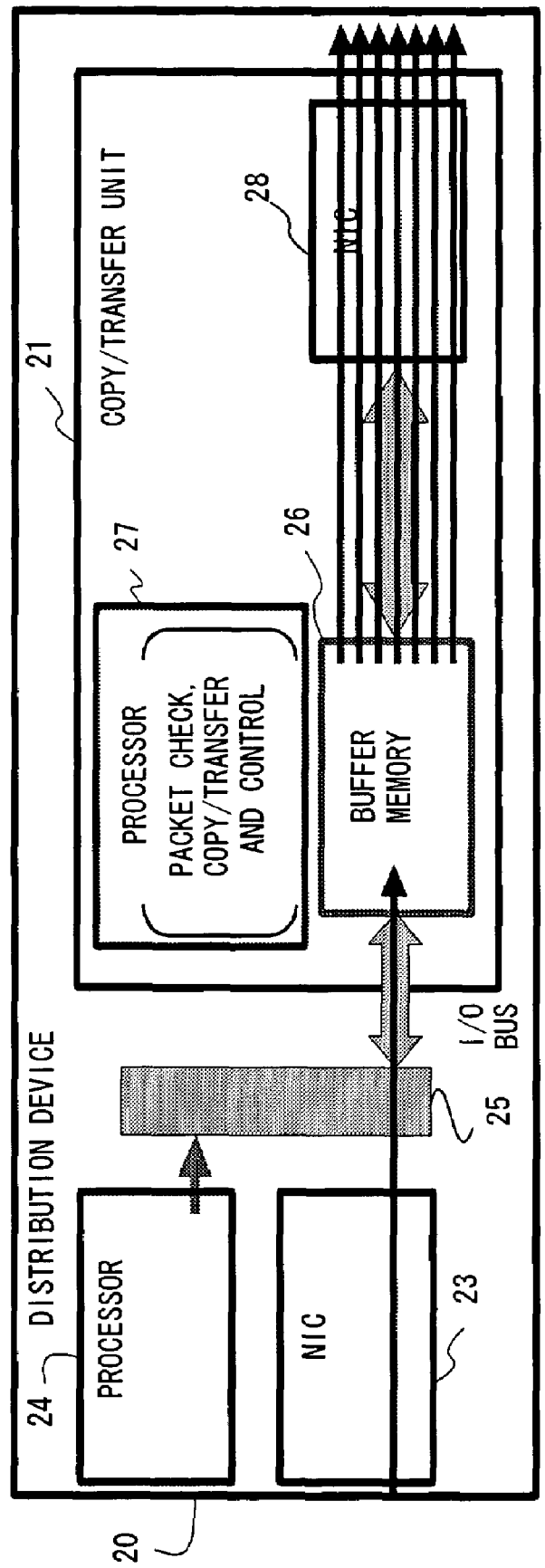
FIG. 7 shows an example configuration of a distribution device.

Next, the configuration of a distribution device provided for the distributor 13 shown in FIG. 2B is described with reference to FIG. 7. In FIG. 7, a copy/transfer unit 21 is added to a general-purpose distribution device that relays distribution data and the like.

In the general-purpose distribution device, for example, after data that is inputted from a network interface card (NIC) 23 on an input side is stored in buffer memory, which is not shown in FIG. 7 through an I/O bus 25, the transfer destination of the data packet is controlled by a processor 24 and is outputted to the network through a NIC on an output side again.

The data packet inputted from the NIC 23 in FIG. 7 is stored in the buffer memory 26 in the copy/transfer unit 21 through the I/O bus 25. A processor 27 checks the inputted data packet and controls the copy/transfer of it.

Specifically, distribution data identification information, such as a stream identifier, and a command, which is control information, can be extracted by checking the source network address of the inputted data packet. Then, the copy/transfer of a packet, which is described later, or the addition of a receiver is conducted depending on their contents. For example, after unnecessary control information in the data packet, that is, an unnecessary command, is converted, the packet is outputted to a receiver or a subsequent distributor through a NIC 28.

Figure 8:
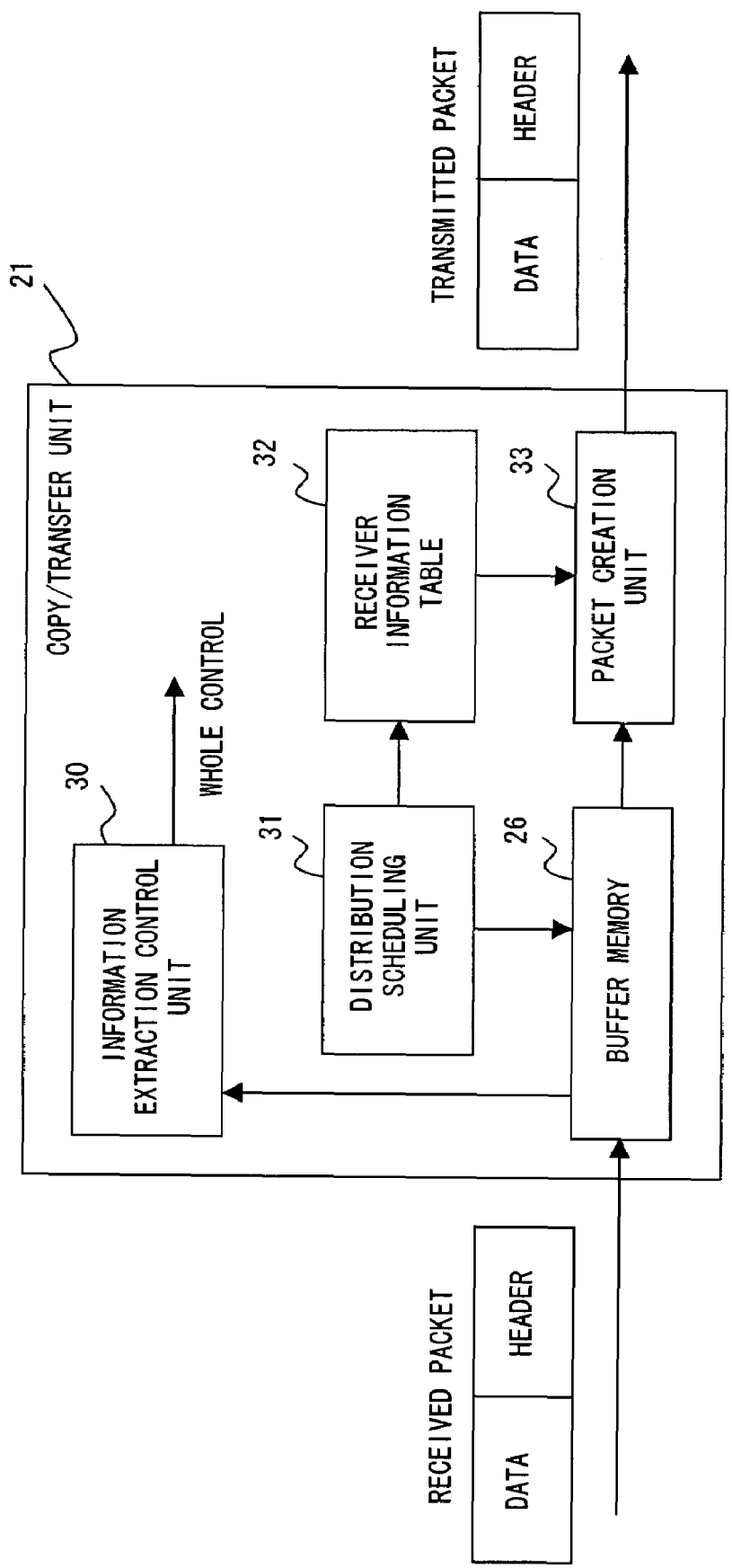
FIG. 8 shows the functional configuration of a cop/transfer unit.

FIG. 8 shows the functional configuration of the copy/transfer unit 21 shown in FIG. 7. In FIG. 8, the copy/transfer unit 21 comprises buffer memory 26 storing a received packet, an information extraction control unit 30 extracting necessary information from the received packet and also exercising the overall control, a distribution scheduling unit 31 laying out the distribution schedule of distribution data, such as stream data and the like, a receiver information table 32 storing the receiver information of distribution data and a packet creation unit 33 creating a packet to be transmitted to a receiver based on both the schedule laid out by the distribution scheduling unit 31 and the contents of the receiver information table 32.

FIG. 9 shows an example of the stored contents of the receiver information table 32 shown in FIG. 8. In FIG. 9, data to be distributed to its receiver according to its address, that is, the network address of the receiver, such as a stream identifier, a distribution (available/unavailable) flag indicating whether the stream data should be currently distributed to the receiver or the distribution should be stopped and other data, such as a head pattern corresponding to each receiver that is used for the packet creation unit 33 shown in FIG. 8, used to create a packet to be transmitted, are stored in the receiver information table 32 in relation to the destination of distribution data, that is, the network address of the receiver.

Figure 10:
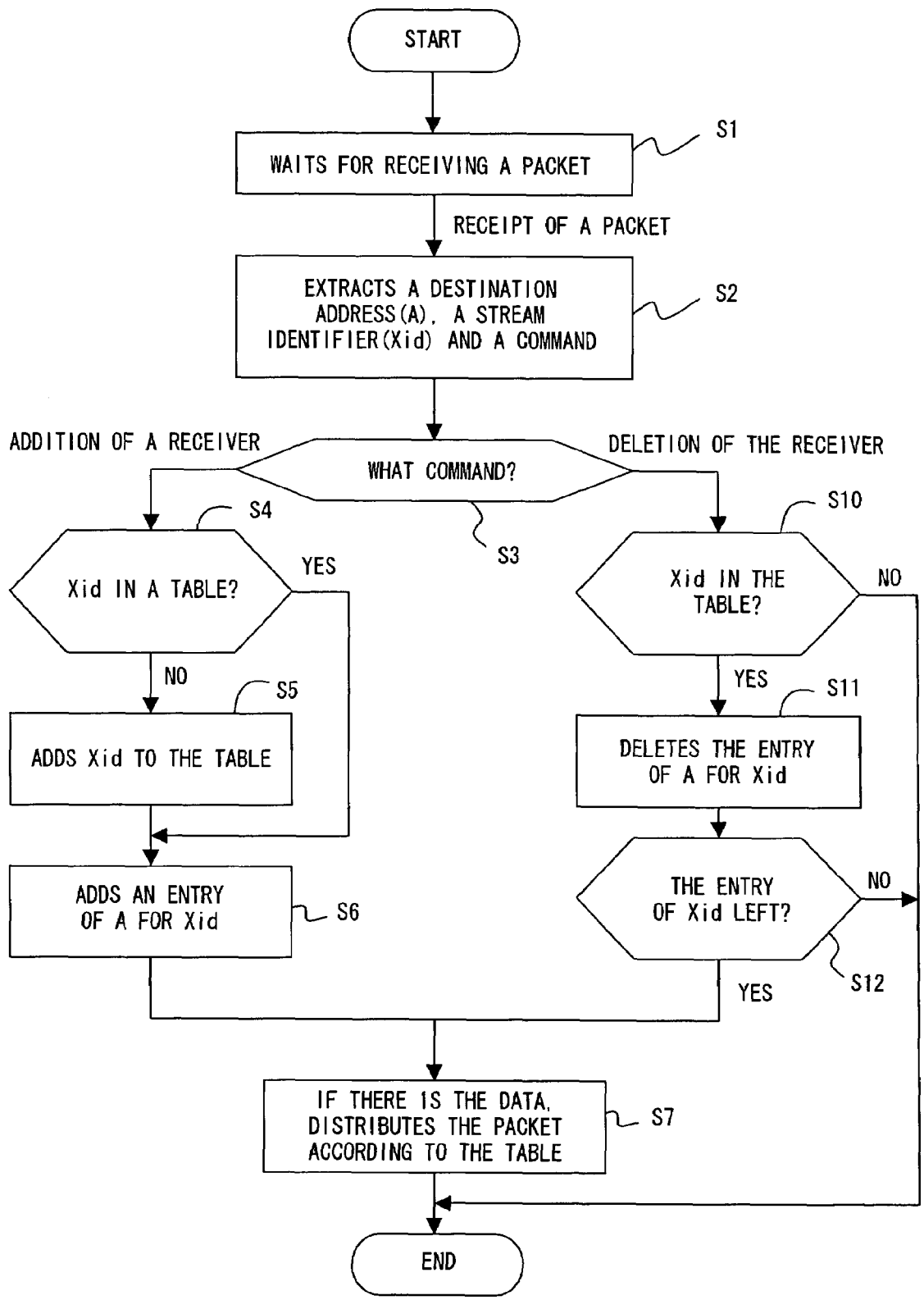
FIG. 10 is a flowchart showing a process performed when receiving control information.

FIG. 10 is a flowchart showing a process according to control information, that is, the contents of a command. Here, the process of a command to add or delete a receiver is described. Firstly, when in a packet waiting state of step S1, a packet is received, then in step S2 the destination information described in FIG. 3, that is, the network address of a receiver A, a stream identifier Xid and a command are extracted from the source network address described in FIG. 4. Then, in step S3, the contents of the command are analyzed.

If the command is control information about the addition of a receiver, in step S4 it is judged whether the stream identifier Xid is stored in the receiver information table described in FIG. 9. If in step S4 the stream identifier Xid is not stored, then in step S5 the identifier is added to the receiver information table. Then, the process proceeds to step S6. If in step S4 the stream identifier Xid is stored, the process immediately proceeds to step S6.

Then, in step S6, the destination information extracted in step S2, that is, the entry of the receiver A, is added. If distribution data is stored in the received packet, then in step S7 the packet is copied according to the contents of the table, and generally it is distributed to a plurality of receivers. Then, the process terminates.

Specifically, if in FIG. 9 there is the entry of a receiver B as destination, the packet is also transferred to the receiver B that corresponds to the stream identifier even if the destination of the packet received from the sender is A. In this preferred embodiment, if a packet that stores no distribution data from a sender is received, it is judged that the packet is aimed at control, such as, the addition of an entry to a receiver information table, and no process is applied to a receiver.

If as a result of the command analysis of step S3, control information indicates the deletion from the receiver information table, then in step S10 it is judged whether there is an entry corresponding to the command in the table. If in step S10 it is judged that there is no such entry in the table, the process terminates without performing any further process.

If in step S1 it is judged that there is the entry, then in step S11 the entry indicating the receiver and stream identifier that correspond to the command are deleted, and in step S12 it is judged whether an entry corresponding to the stream identifier is left in the table. If in step S12 it is judged that such an entry is not left in the table, the process immediately terminates. If in step S12 it is judged that such an entry is left and if data is stored in the received packet, in step S7 the packet is distributed to a destination to which stream data corresponding to the stream identifier should be distributed, depending on the contents of the table and the process terminates.

Specifically, even when a receiver is deleted, one packet can not only notify a distributor of control information for the deletion, but also instruct a distributor to distribute the data to other receivers.

In FIG. 10, only the process of the addition or deletion of a receiver is described. However, for example, data distribution to a specific receiver can also be temporarily stopped by resetting the contents of the distribution (available/unavailable) flag of the receiver information table shown in FIG. 9, for example, to 0. In this case, the data distribution is stopped until the flag is reset to 1 again. Such a process, including the re-distribution of data, can be performed depending on the contents of the command shown in FIG. 4.

FIG. 11 shows an example of the stored contents of a stream distribution table provided for the sender 10 shown in FIG. 2B. On the sender side, stream identifiers and network addresses each of which is allocated to each of a plurality of stream names, and distribution destinations indicating the network addresses of receivers are stored in a table. When a new stream is transmitted, data is registered in this table and the data packet is transferred to a distributor.

In such a preferred embodiment, even when a data stream is distributed to a plurality of receivers, by transmitting one data packet to one receiver, a sender can transfer the data packet to a plurality of receivers with an entry corresponding to the same stream identifier according to the contents of the receiver information table when the data packet reaches a receiver that is set in the data packet, for example, when it reaches a distributor firstly located on the route to A in the network.

For example, when in FIG. 9 a data packet for destination B reaches a distributor after the entry of destination A is registered, the entry of B is added to the receiver information table, and simultaneously the packet is copied and transferred to two destinations A and B.

In this case, regarding the destination B, the entry is added to the receiver information table of the distributor and even when another distributor is provided on the route leading to the destination B from the distributor in a network, there is no need to create an entry in the receiver information table of the distributor while in the middle again. By modifying the contents of the command to no operation (NOP) when the first distributor adds the entry to the receiver information table, the addition of an entry to the receiver information table of the other distributor can be done without.

As described in FIG. 4, each source network address is linked to each stream identifier and simultaneously is linked to each command, which is control information. For example, although in FIG. 11 each network address is linked to each stream identifier, different network addresses must be used for the same stream to distinguish the addition of a receiver from the deletion, as described in FIG. 10.

As described earlier, if a specific sender can use, for example, 100 network addresses, X1 through X100, he/she must select one or more network addresses from the plurality of network addresses, X1 through X100, each of which corresponds to the same stream identifier of, for example, the stream "image 1" shown in FIG. 11 and corresponds to a different command.

In this way, even if the distributor modifies the contents of the command to "NOP", for example, an ICMP packet can be transmitted without any problem with only a network address that is correctly allocated in relation to the command "NOP".

Figure 12:
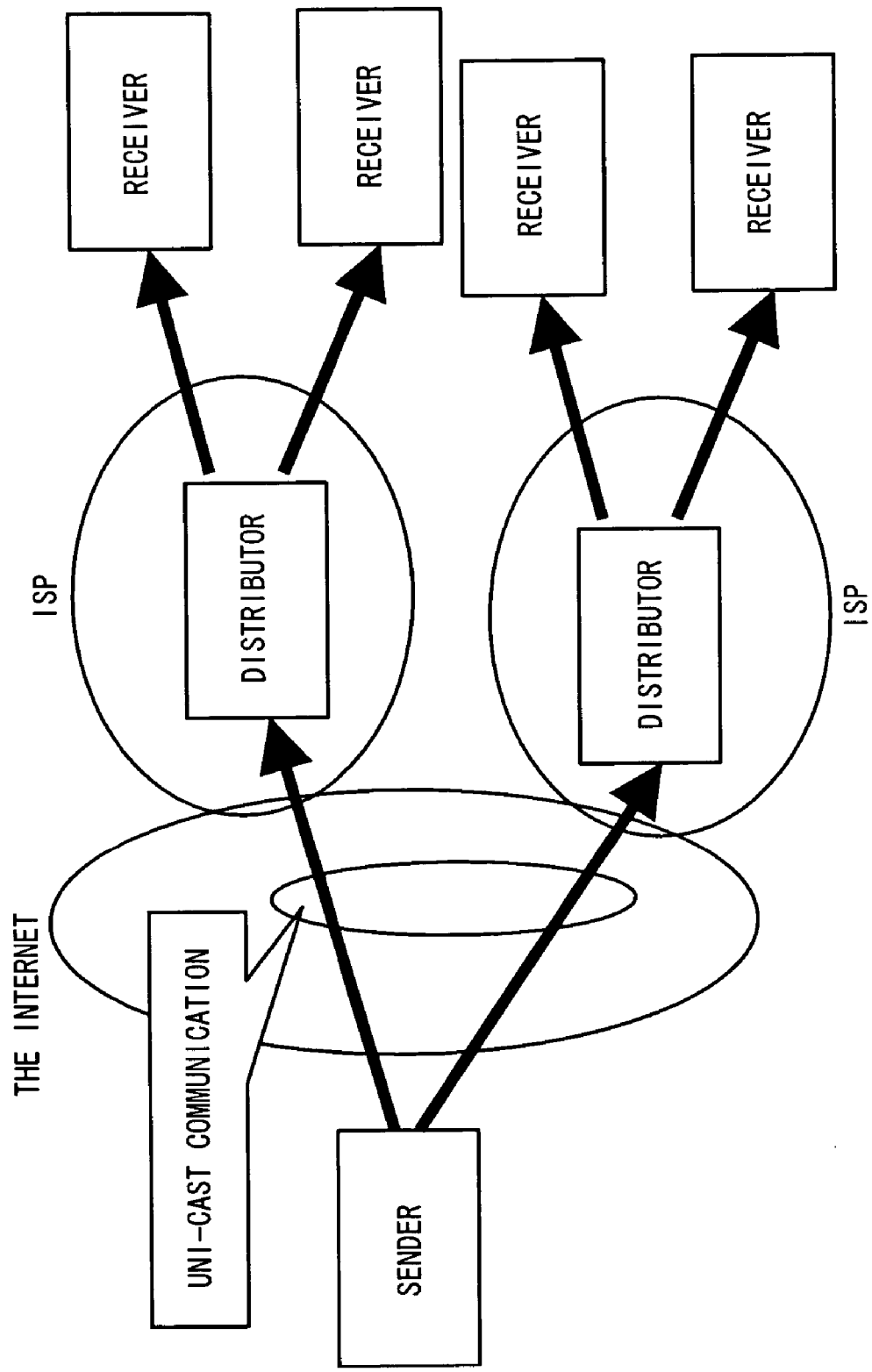
FIG. 12 show the second example configuration of a broadcast type communication system in the preferred embodiment.

FIGS. 12 and 13 show the second and third example configurations of a communication system in the preferred embodiment, respectively. In FIG. 12, a distributor is provided for each Internet service provider (ISP) and each distributor distributes data to receivers that its ISP accommodates. By distributing data for each ISP, there is no need for a sender to worry about the increase of the number of receivers that the ISP may have to accommodate.

In this case, since the entire ISP group becomes one network management unit (autonomous system (AS)), a variety of methods are available. For example, uni-cast communication by an IP address can be conducted between a sender and a distributor, while uni-cast communication by a MAC address or conventional multi-cast communication can be conducted between the distributor and a receiver.

In the third configuration shown in FIG. 13, the scale of a network can be extended by providing a distributor for each of a plurality of stages of ISP. In this case too, a variety of address methods described in the preferred embodiments are available. Specifically, in this case, it is important only for a sender to provide a distributor with distribution data identification information, control information and receiver information and for the distributor to correctly distribute the data packet to an appropriate receiver or an appropriate subsequent-stage distributor.

As described in detail above, according to the present invention, in uni-cast broadcast type communication, network traffic between a sender and a distributor can be reduced. By appropriately providing distributors, a communication system realizing a large-scale broadcast type communication can be built while suppressing network traffic.

By storing and transmitting both information that identifies distribution data and control information about distribution in a packet that stores the distribution data in order to transmit/receive data for distribution between a sender and a distributor, the distributor can manage receivers only by checking the distribution data received from the sender. Accordingly, control by a distributor can be simplified and the speed can be improved, which greatly improves the efficiency of broadcast type communication.

What is claimed is:

1. A broadcast type communication data distribution apparatus distributing broadcast type communication data in a network, comprising:
   a first network interface card receiving segments of broadcast type communication data sent from a sender through the network as uni-cast communication, the broadcast type communication data having a network address stored in a source address field, which is assigned to be unique in the network on a basis of an identifier of the broadcast type communication data, and control information relating to a relay, a copy and a transfer; and
   a copy/transfer unit, wherein the copy/transfer unit includes:
      a buffer memory temporarily storing the received broadcast type communication data;
      a storage unit storing, in relation to the identifier of the broadcast type communication data, a receiver address to which copied broadcast type communication data is transmitted and a data transfer available/unavailable flag indicating whether a transmission to a receiver is possible;
      a second network interface card being connected to the network and transmitting the broadcast type communication data; and
      a processor, wherein the processor executes
         extracting the identifier of the broadcast type communication data and the control relating to a relay, a copy and a transfer by analyzing the network address stored in the source address field of the received broadcast type communication data;
         relaying the broadcast type communication data to be transmitted through the second network interface card in order to transmit the broadcast type communication data to the receiver;
         acquiring the receiver address and the data transfer available/unavailable flag corresponding to the identifier of the received broadcast type communication data from the storage unit;
         copying the broadcast type communication data on a basis of the acquired data transfer available/unavailable flag; and
         transferring the copied broadcast type communication data to one or more receivers other than the addressed receiver or to another distribution device through the second network interface card on a basis of the acquired receiver address;
         wherein the processor sets the data transfer available/unavailable flag, stored in the storage unit, of a receiver address that matches the destination address of the received broadcast type communication data to unavailable when the processor extracts a command from control information indicating a stoppage of data distribution to a receiver.

2. The broadcast type communication data distribution apparatus according to claim 1, wherein the processor adds, to the storage unit, the identifier of the received broadcast type communication data, and a destination address of the broadcast type communication data as a receiver address in relation to the identifier, when the processor extracts a command from control information indicating an addition of a receiver.

3. The broadcast type communication data distribution apparatus according to claim 1, wherein the processor deletes, from the storage unit, an entry having a receiver address that matches a destination address of received broadcast type communication the data in relation to the identifier of the received broadcast type communication data, when the processor extracts a command from control information indicating a deletion of a receiver.

4. The broadcast type communication data distribution apparatus according to claim 1, wherein the processor deletes, from the storage unit, all entries having the identifier in its entry in relation to the identifier of the received broadcast type communication data when the processor extracts a command from control information indicating a deletion of all receivers of broadcast type communication data corresponding to the identifier of the data.

5. The broadcast type communication data distribution apparatus according to claim 1, wherein the processor sets the data transfer available/unavailable flag, stored in the storage unit, of a receiver address that matches the destination address of the received broadcast type communication data to available when the processor extracts a command from control information indicating a re-start of broadcast type communication data distribution to a receiver.

6. The broadcast type communication data distribution apparatus according to claim 1, wherein the processor relays or copies/transfers all segments of the broadcast type communication data received from the sender, including the extracted control information.

7. The broadcast type communication data distribution apparatus according to claim 1, wherein the processor converts the extracted control information into scrambled information received from the sender and relays or copies and transfers converted broadcast type communication data.

8. The broadcast type communication data distribution apparatus according to claim 1, wherein when a target for which broadcast type communication data is relayed or copied/transferred is a receiver of the broadcast type communication data, the processor converts the extracted control information into scrambled information received from the sender and relays or copies and transfers converted broadcast type communication data.

9. The broadcast type communication data distribution apparatus according to claim 1, wherein the broadcast type communication data received from the sender includes no data to be finally provided for a receiver.

10. The broadcast type communication data distribution apparatus according to claim 1, wherein the processor analyzes a source address, which is a private address of a MAC address in an Ethernet, and recognizes the broadcast type communication data in a layer 2 network.

11. The broadcast type communication data distribution apparatus according to claim 1, wherein the processor analyzes a source address, which is an Internet protocol address, and recognizes the broadcast type communication data in a layer 3 network.

12. The broadcast type communication data distribution apparatus according to claim 1, wherein the processor analyzes a source address, which is a port number of a user data protocol or a transmission control protocol, and recognizes the broadcast type communication data in a layer 4 network.

13. A broadcast type communication system conducting broadcast type communications, comprising:
- a transmitter apparatus transmitting segments of broadcast type communication data sent from a sender through a network as uni-cast communication, the broadcast type communication data having a network address stored in a source address field, which is assigned to be unique in the network on a basis of an identifier of the broadcast type communication data, and control information relating to a relay, a copy and a transfer; and
- a broadcast type communication data distribution apparatus including:
  - a first network interface card receiving the segments of the broadcast type communication data transmitted from the transmitter apparatus; and
  - a copy/transfer unit, wherein the copy/transfer unit includes:
    - a buffer memory temporarily storing the received broadcast type communication data;
    - a storage unit storing, in relation to the identifier of the broadcast type communication data, a receiver address to which the copied broadcast type communication data is transmitted and a data transfer available/unavailable flag indicating whether a transmit to a receiver is possible;
- a second network interface card being connected to the network and transmitting the broadcast type communication data; and
- a processor, wherein the processor executes:
  - extracting the identifier to the broadcast type communication data and control information relating to a relay, a copy and a transfer by analyzing the network address stored in the source address field of the received broadcast type communication data;
  - relaying the broadcast type communication data to be transmitted through the second network interface card in order to transmit the broadcast type communication data to the receiver;
  - acquiring the receiver address and the data transfer available/unavailable flag corresponding to the identifier of the received broadcast type communication data from the storage unit;
  - copying the broadcast type communication data on a basis of the acquired the data transfer available/unavailable flag; and
  - transferring the copied broadcast type communication data to one or more receivers other that the addressed receiver or to another distribution device through the second network interface card, on a basis of the acquired receiver address;
  - wherein the processor sets the data transfer available/unavailable flag, stored in the storage unit, of a receiver address that matches the destination address of the received broadcast type communication data to unavailable when the processor extracts a command from control information indicating a stoppage of data distribution to a receiver.

* * * * *

UNITED STATES PATENT AND TRADEMARK OFFICE
CERTIFICATE OF CORRECTION

PATENT NO. : 7,590,757 B2　　　　　　　　　　　　　　　　　　　　　　　　Page 1 of 1
APPLICATION NO. : 10/608064
DATED : September 15, 2009
INVENTOR(S) : Akira Jinzaki It is certified that error appears in the above-identified patent and that said Letters Patent is hereby corrected as shown below:

Column 12, Line 26, after "acquired" delete "the".

Column 12, Line 29, change "that" to --than--.

Signed and Sealed this

Twenty-fourth Day of November, 2009

David J. Kappos
*Director of the United States Patent and Trademark Office*